United States Patent
Biliris et al.

(10) Patent No.: US 6,212,552 B1
(45) Date of Patent: Apr. 3, 2001

(54) DECLARATIVE MESSAGE ADDRESSING

(75) Inventors: Alexandros Biliris, Chatham; Gisli Hjalmtysson, Gillette; Hosagrahar Visvesvaraya Jagadish, Berkeley Heights; Mark Alan Jones, New Providence, all of NJ (US); Dongwon Lee, Los Angeles, CA (US); Inderpal Singh Mumick, Berkeley Heights, NJ (US); Euthimios Panagos, New Providence, NJ (US); Divesh Srivastava, Summit, NJ (US); Dimitra Vista, Philadelphia, PA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/007,518

(22) Filed: Jan. 15, 1998

(51) Int. Cl.[7] ........................... G06F 15/16
(52) U.S. Cl. ........................... 709/206; 709/245
(58) Field of Search ............. 370/351; 345/326; 707/104, 3, 5; 709/206, 217, 218, 219, 245

(56) References Cited

U.S. PATENT DOCUMENTS

| | | | |
|---|---|---|---|
| 5,283,856 | * | 2/1994 | Gross et al. .............. 709/206 X |
| 5,333,266 | | 7/1994 | Boaz et al. . |
| 5,428,778 | * | 6/1995 | Brookes ......................... 707/5 |
| 5,459,717 | * | 10/1995 | Mullan et al. .................. 370/351 |
| 5,493,564 | * | 2/1996 | Mullan .......................... 370/351 |
| 5,555,426 | * | 9/1996 | Johnson et al. ................ 709/206 |
| 5,564,018 | * | 10/1996 | Flores et al. .................. 709/206 |
| 5,632,011 | * | 5/1997 | Landfield et al. .............. 345/326 |
| 5,664,185 | * | 9/1997 | Landfield et al. .............. 707/104 |
| 5,742,769 | * | 4/1998 | Lee et al. ..................... 709/206 |
| 5,764,906 | * | 6/1998 | Edelstein et al. ............... 709/245 |
| 5,822,526 | * | 10/1998 | Waskiewicz .................. 709/206 |
| 5,864,684 | * | 1/1999 | Nielsen ....................... 709/206 |
| 5,884,034 | * | 3/1999 | Ohishi et al. ................. 709/206 |
| 5,893,091 | * | 4/1999 | Hunt et al. ..................... 707/3 |

* cited by examiner

Primary Examiner—Zarni Maung
Assistant Examiner—Patrice Winder

(57) ABSTRACT

A messaging system, and method of operation thereof, which supports combinations of directory and mailing list addressing mechanisms. Intended message recipients are specified as declarative addresses, which may include combinations of directory and mailing list information. The messaging system includes a messaging server and an address resolution module. The messaging server receives a message from a sender system and transmits the message to the recipient system. The address resolution module, which is coupled to the messaging server, receives a declarative address associated with the message, resolves the declarative address into at least one messaging address and transmits the at least one messaging address to the messaging server. In one embodiment, a database system may be coupled to the address resolution module to allow address resolution based on information stored in a database. The address resolution module generates a database query based on the declarative address and transmits the generated query to a database system. The database system receives a database query, retrieves at least one messaging address specified by the query and transmits the retrieved at least one messaging address to the address resolution module.

23 Claims, 6 Drawing Sheets

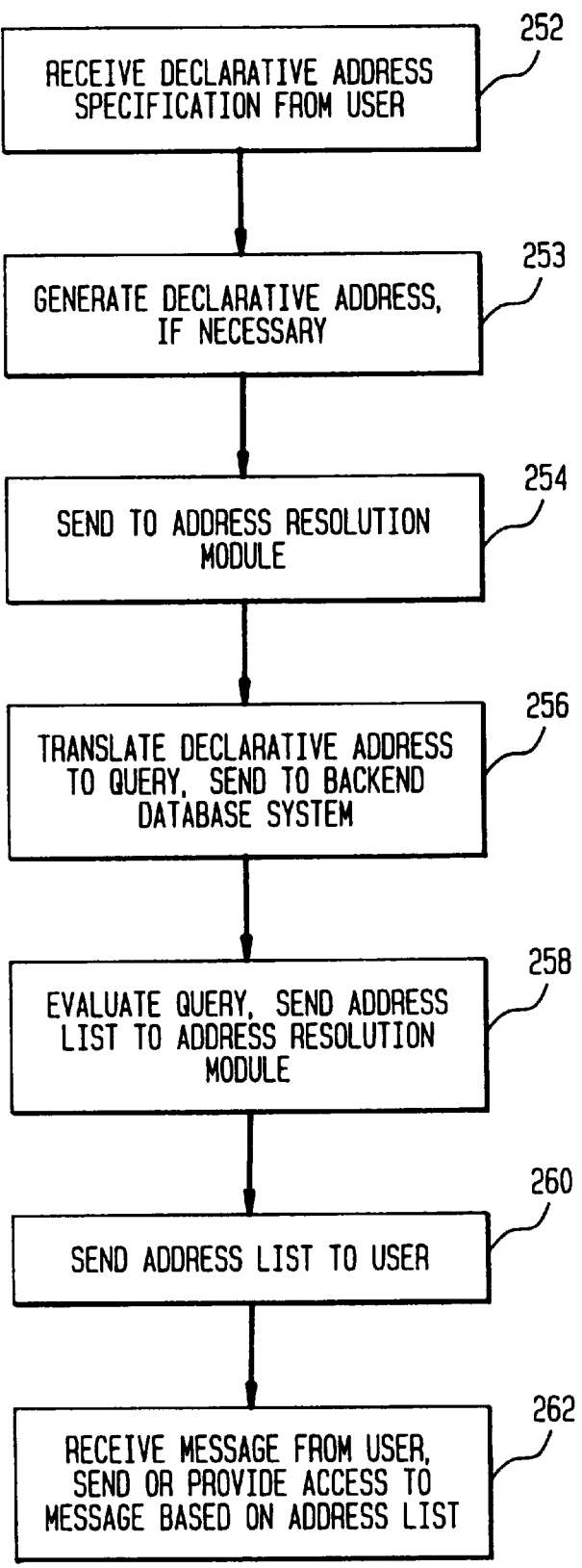

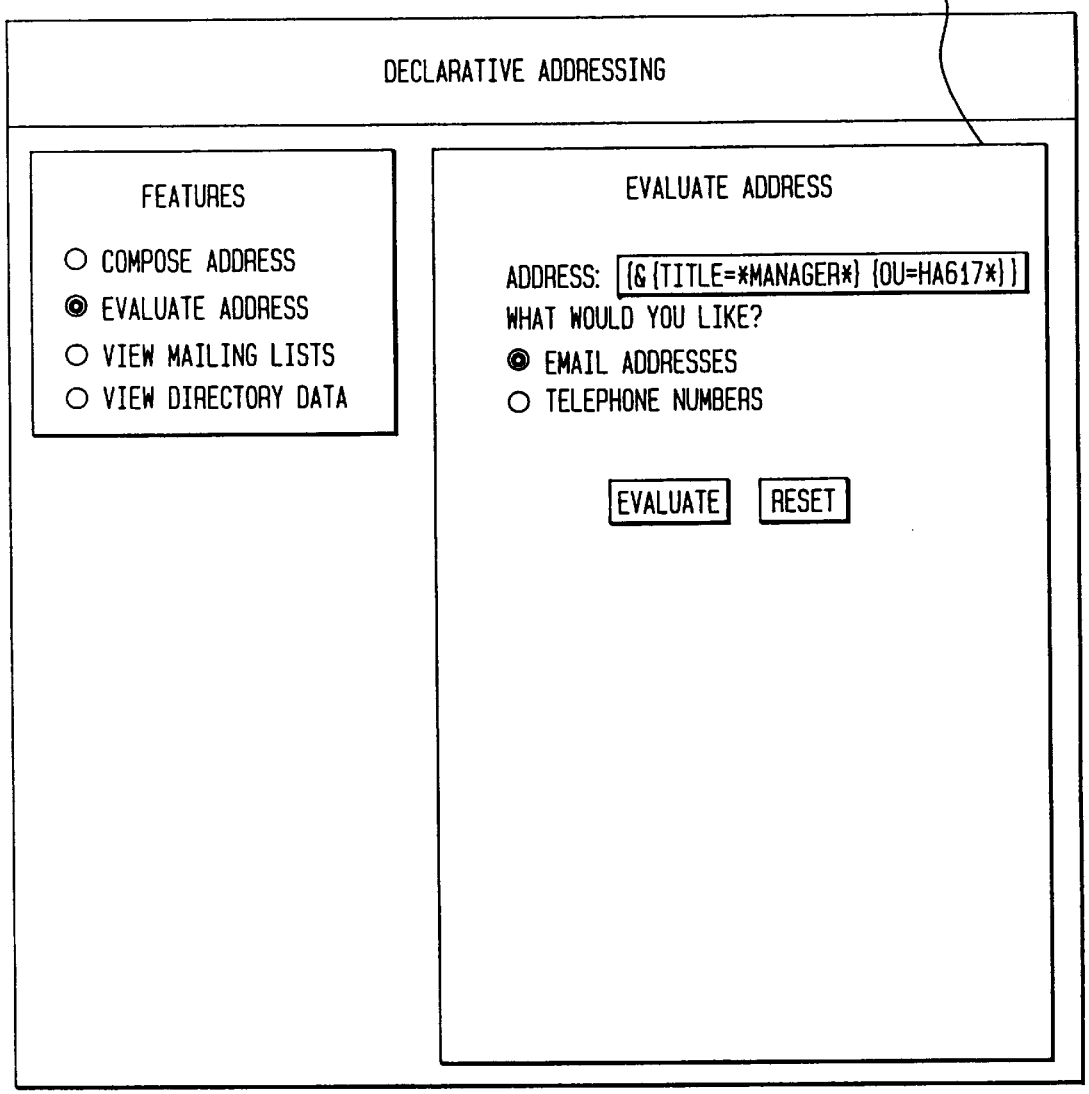

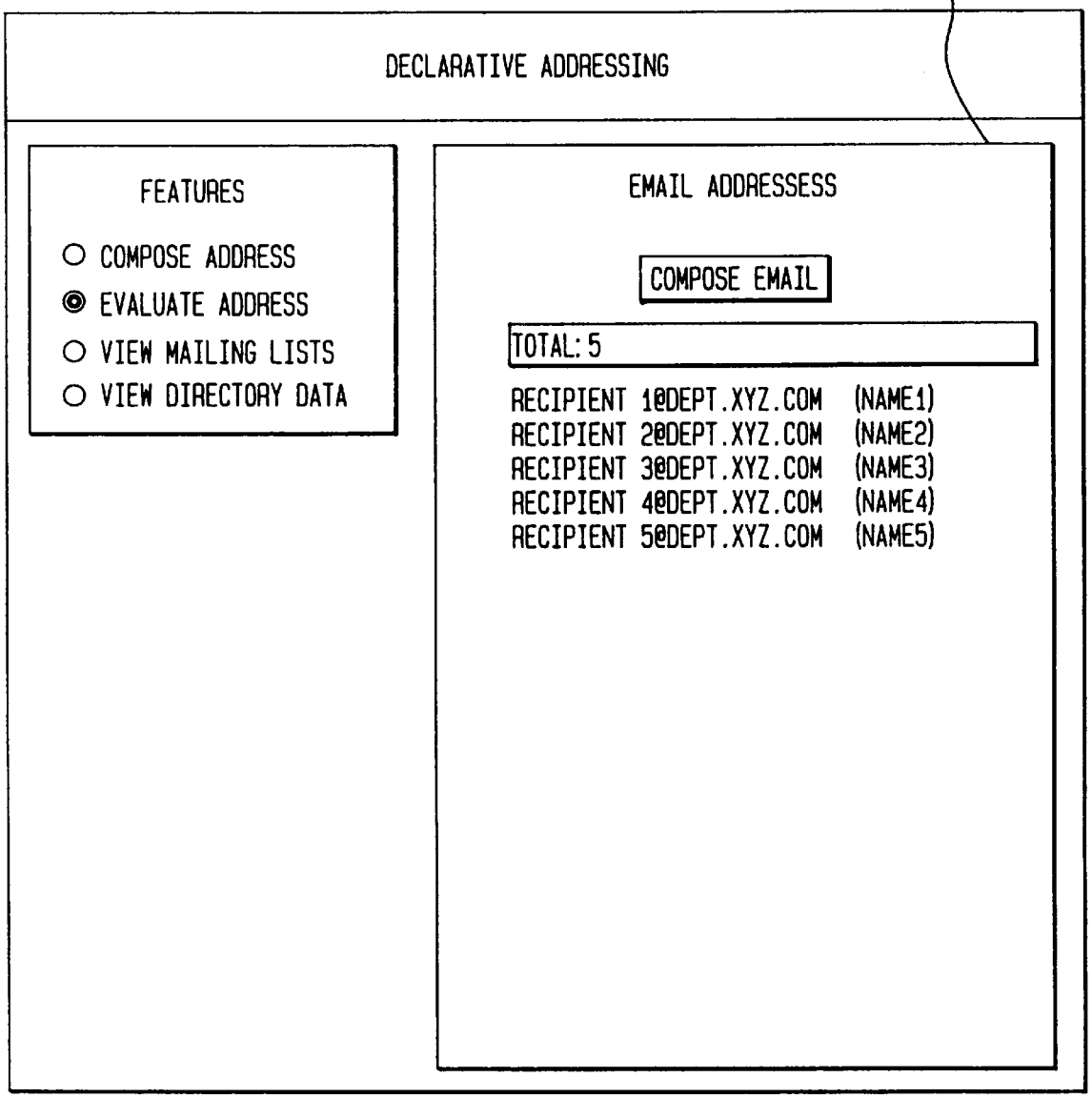

DECLARATIVE MESSAGE ADDRESSING

FIELD OF THE INVENTION

The present invention relates to specifying, generating and evaluating messaging addresses in a messaging system

BACKGROUND OF THE INVENTION

When an electronic mail (e-mail) message is sent, the intended recipients of the message are typically specified by listing their e-mail identifiers. For example, an e-mail address might be specified as "login-id@domain-name". Such an address uniquely identifies the recipient globally.

However, a need arises to specify the intended recipients of a message, not by their identities, but rather by properties associated with the recipients. For example, desired sets of recipients might be described by the properties: "company employees interested in databases", "company employees who work in New Jersey", "company employees interested in databases and who work in New Jersey", etc. Such property-based addressing is currently supported by two distinct mechanisms.

One prior art mechanism that supports property-based addressing is directory addressing. Use of a directory allows for the specification of a combination of attribute value pairs to select an intended set of recipients. The attribute names must be part of the directory schema. For example, a company e-mail directory of employees may have attributes indicating the state in which each employee works and the salary grade or title of each employee. Prior art systems allow the use of conjunctive specifications of the form "state=nj:t1=SGD", where "state=nj" specifies the state of New Jersey, "t1=SGD" specifies a title of "SGD" and ":" is the conjunction operator. Thus, this specification would indicate all company employees who work in New Jersey and who have a title of "SGD". Such a directory based addressing scheme is described in commonly-owned U.S. patent application Ser. No. 08/581,654 by Mark Jones, which is hereby incorporated by reference.

Another prior art mechanism that supports property-based addressing is mailing lists. Mailing lists are a mechanism for creating lists of identities of message recipients. Once a mailing list is defined, a message sender may select a set of intended recipients without actually knowing the identities of the recipients. For example, a mailing list designated "codb" may contain the identities of company employees interested in databases, and a mailing list "comsg" may contain the identities of company employees who are interested in messaging.

Current messaging systems are limited in that they do not support combinations of directory and mailing list addressing mechanisms, even though some current messaging systems support each mechanism separately. For example, it is not currently possible to specify that the intended recipients of a message are "company employees whose salary grade is SGD and who are members of the 'codb' mailing list". A related limitation is that current messaging systems that support the use of mailing lists do not permit the specification of intended recipients using arbitrary combinations of individual mailing lists. For example, it is not currently possible to specify that the intended recipients of a message are "company employees who are in the intersection of the mailing lists 'codb' and 'comsg'".

Another limitation of current messaging systems is that membership in mailing lists must be explicitly enumerated, and cannot make use of directory information. For example, it is not currently possible to specify that members of the mailing list "ha6117" are "company employees whose organization code in the directory is HA6117000". This may lead to replication of information and potential inconsistencies in the information maintained.

A need arises for a technique which supports combinations of directory and mailing list addressing mechanisms, provides the capability to specify intended message recipients using combinations of mailing list and directory information and does not require mailing lists to be explicitly enumerated.

SUMMARY OF THE INVENTION

The present invention is a messaging system, and method of operation thereof, which supports combinations of directory and mailing list addressing mechanisms, provides the capability to specify intended message recipients using combinations of mailing list and directory information and does not require mailing lists to be explicitly enumerated. The present invention allows intended message recipients to be specified as declarative addresses, which may include combinations of directory and mailing list information.

A messaging system, according to the present invention, includes a messaging server and an address resolution module. The messaging server receives a message from a sender system and transmits the message to the recipient system. The address resolution module, which is coupled to the messaging server, receives a declarative address associated with the message, resolves the declarative address into at least one messaging address and transmits the at least one messaging address to the messaging server.

In one embodiment, a database system may be coupled to the address resolution module to allow address resolution based on information stored in a database. The address resolution module generates a database query based on the declarative address and transmits the generated query to a database system. The database system receives a database query, retrieves at least one messaging address specified by the query and transmits the retrieved at least one messaging address to the address resolution module The declarative address may specify directory information, mailing list information, or a combination of directory information and mailing list information.

The present invention is operable with electronic message of all kinds, including, for example, e-mail messages, voice-mail messages, fax messages, conference calls, and paging messages.

BRIEF DESCRIPTION OF THE DRAWINGS

The details of the present invention, both as to its structure and operation, can best be understood by referring to the accompanying drawings, in which like reference numbers and designations refer to like elements.

FIG. 2b is a flow diagram of another embodiment of a messaging process, implemented in the system of FIG. 1.

FIG. 3b is an exemplary screen, which allows a user to transmit a declarative address for evaluation, in the system of FIG. 1.

FIG. 3c is an exemplary screen, which displays the message addresses resulting from the evaluation of a declarative address, in the system of FIG. 1.

DETAILED DESCRIPTION OF THE INVENTION

The property based message addressing scheme of the present invention combines the advantages of both the directory and the mailing list approaches. The present invention allows intended recipients to be specified as a combination of attribute-value pairs and membership in individual mailing lists. Further, the present invention allows membership in mailing lists to make use of directory information.

Figure 1:
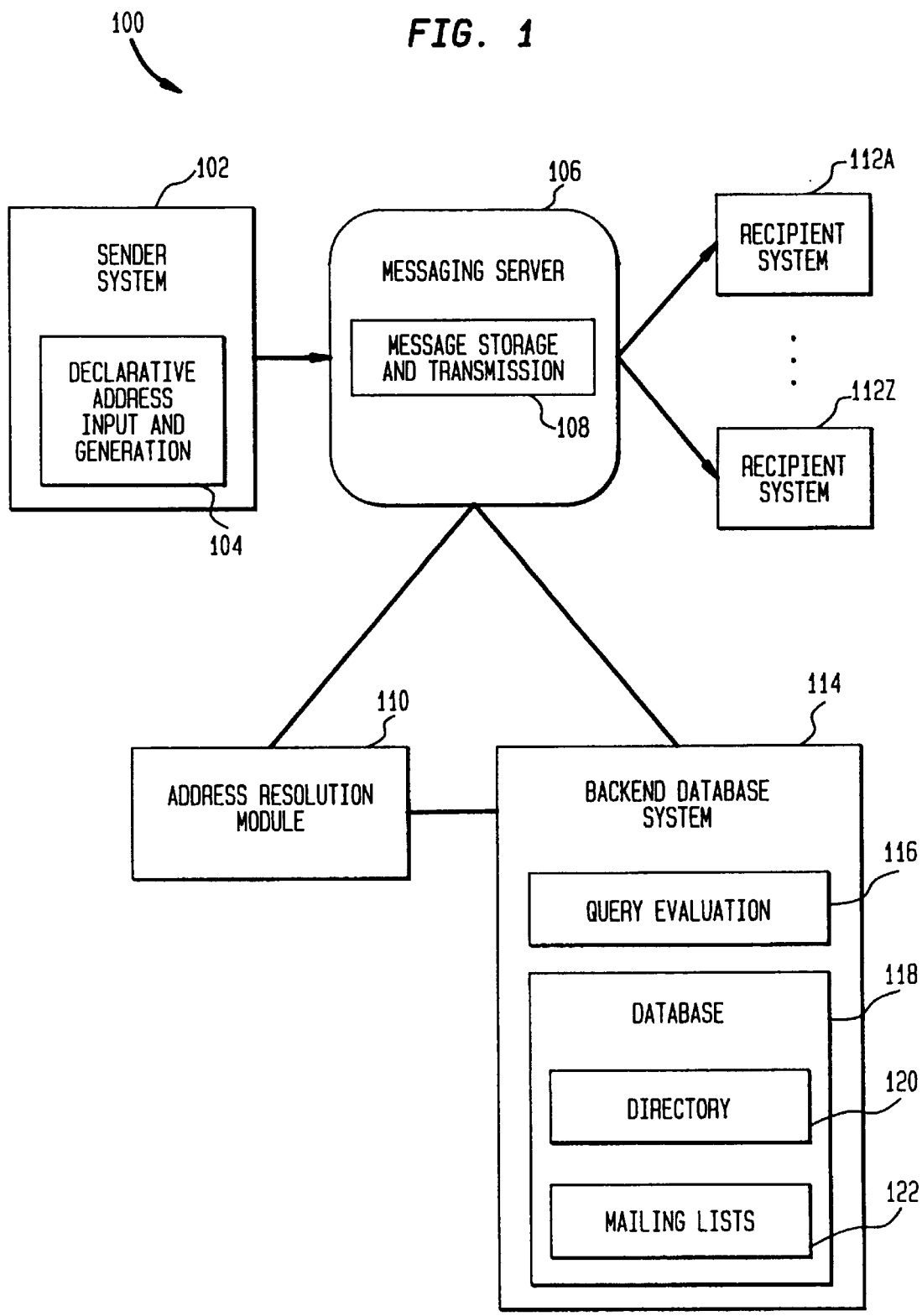
FIG. 1 is a block diagram of a messaging system, according to the present invention.

A messaging system 100, according to the present invention, is shown in FIG. 1. A user desiring to send a message operates sender system 102, which includes declarative address input and generation block 104. Sender system 102 is typically a computer system, such as a personal computer or workstation, but may also be a minicomputer or mainframe, or a device such as a fax machine, telephone, etc. The present invention is applicable to any electronic message type, such as voice messages, FAX messages, paging messages, conference calls, etc. For clarity, only one sender system is shown, which is representative of a plurality of sender systems.

Declarative address input and generation block 104 is typically software running on sender system 102. Sender system 102 is communicatively connected to messaging server 106 over a communication network. The communication network depends on the implementation and may include any well-known network, such as the Internet, a private local or wide-area network, the public switched telephone network, a wireless network, etc.

Messaging server 106 includes message storage and transmission block 108. Message storage and transmission block 108 is typically a combination of hardware and software, which receives messages and stores the received messages. In one embodiment, the received messages are transmitted to the addressed recipients. In another embodiment, the received messages are available for access by the addressed recipients.

Messaging server 106 is communicatively connected to address resolution module 110. Address resolution module 110 receives a declarative address from messaging server 106, resolves the declarative address into a list of individual e-mail addresses and sends the address list to messaging server 106, for use in transmitting or providing access to the messages to the recipients in the address list. Address resolution module 110 may be separate from messaging server 106 and database system 114, or it may be included in either messaging server 106 or database system 114. Address resolution module 110 may be implemented as software running on messaging server 106 or database system 114. If address resolution module 110 is separate, it may be located near messaging server 106, in which case the communications connection may be, for example, a direct connection or a local area network. Address resolution module 110 may be located geographically distant from messaging server 106 and/or backend database system 114, in which case the communication connections may be, for example, a wide area network, the public switched telephone network or the Internet. Address resolution module 110 is also communicatively connected to backend database system 114. Backend database system 114 may also be connected to messaging server 106, but this is not required for the present invention.

Messaging server 106 is communicatively connected to recipient systems 112A–Z using any well-known communication network. Each recipient system 112A–Z is typically a computer system, such as a personal computer or workstation, but may also be a minicomputer or mainframe, or a device such as a fax machine, telephone, etc. These devices may be communicatively connected to messaging server 106 by local or wide area networks, the Internet, the public switched telephone network, wireless telecommunication networks, etc., as is appropriate for the particular device. Although, in FIG. 1, system 102 is designated a sender system and systems 112A–Z are designated recipient systems, these designations are functional only. In fact, both sender and recipient systems are typically similar devices and are capable of performing both sender and recipient functions. Messaging server 106 may operate either as a store and forward server, or as a store and access server. In a store and forward server, stored messages are automatically transmitted to the recipient systems, without additional action by the recipient systems. In a store and access server, stored messages are held for the recipient systems, which must take the action of accessing the stored messages. In a store and access server, a notification may be automatically sent to the recipient systems, but action by the recipient systems is required to access the actual messages.

Backend database system 114 includes query evaluation block 116 and database 118, which includes directory information 120 and mailing list information 122. Query evaluation block 116 receives a query, accesses database 118 to retrieve the information requested by the query and transmits the retrieved information. Database 118 includes information relating to users of the messaging system. Directory 120 includes information such as messaging address, name, location, department, etc. for each messaging system user. Mailing lists 122 include information identifying those users who are included in one or more mailing lists. Although directory 120 and mailing lists 122 are shown as separate blocks, this arrangement is shown to aid in understanding the functioning of the present invention. The actual organization of database 118 is dependent upon the implementation, the selection of which is well within the knowledge of one skilled in the art. For example, mailing list block 122 may represent mailing list information separate from directory 120, or mailing list block 122 may represent mailing list information within directory 120. As another example, in one embodiment, database 118 may be organized to accept queries conforming to the standard Lightweight Directory Access Protocol (LDAP). Other embodiments are also possible, such as a database accepting queries in the standard Structured Query Language (SQL).

Figure 2A:
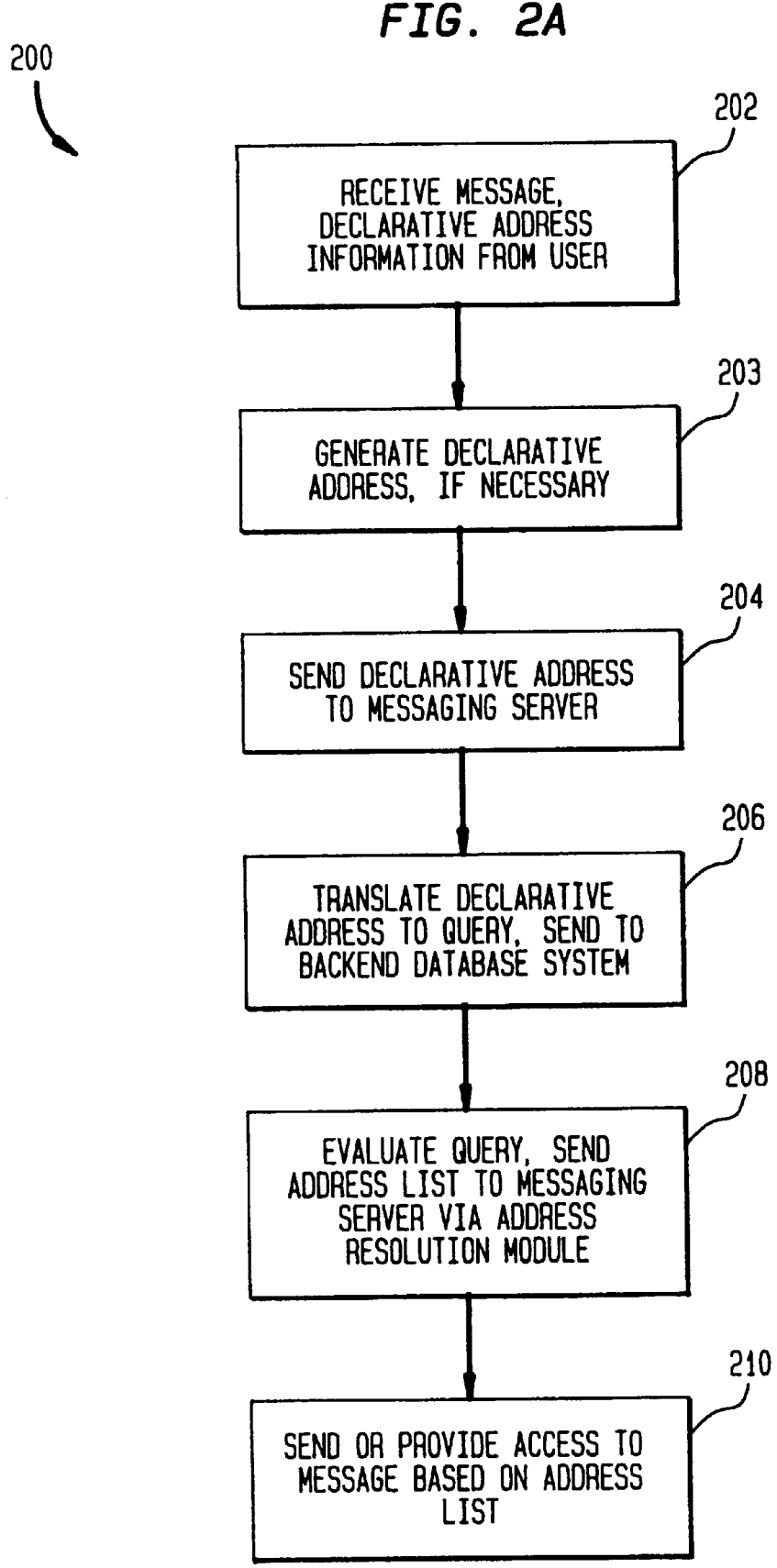
FIG. 2a is a flow diagram of one embodiment of a messaging process, implemented in the system of FIG. 1.

One embodiment of a messaging process 200, according to the present invention, is shown in FIG. 2a. The process begins with step 202, in which a user, who desires to send a message to one or more recipients, inputs the message, which may be an email, voice, video, fax, paging message, etc., into sender system 102. The user specifies the recipients of the message by entering specifications for a declarative address into declarative address input and generation block 104. The user may enter the declarative address directly, in which case step 203 is not necessary, and the process skips to step 204, in which the declarative address is transmitted to messaging server 106. Alternatively, the user may manipulate a text-based or graphical user interface to enter relevant information, in which case, in step 203, block 104 generates the declarative address from the information entered. Then, in step 204, the declarative address is transmitted to messaging server 106.

In step 206, address resolution module 110 receives the declarative address and translates it to a query or set of queries compatible with backend database system 114. Address resolution module 110 generates a set of queries that is optimized to improve performance and decrease loading on database system 114. The number and content of the queries generated depend on the data access scheme being used, such as LDAP or SQL, and on additional annotation information that may be added to the database structure. Such information is an implementation tradeoff which increases performance, but also increases cost due to the additional annotation information which must be stored in the database. The query or set of queries is transmitted to backend database system 114.

In step 208, query evaluation block 116 of backend database system 114 receives the query or set of queries, accesses database 118 to retrieve the information requested by the queries and transmits the retrieved information to address resolution module 110. Address resolution module 110 then transmits the resolved addresses to messaging server 106. The retrieved information is a list of the messaging addresses of all users who satisfy the selection parameters specified by the declarative address that was generated by sender system 102. In step 210, messaging server 106 receives the address list and, in one embodiment, transmits the message to all addresses included in the list. Typically, the list is not transmitted along with the message, so the contents of the list is not revealed to the recipients. In another embodiment, after messaging server 106 receives the address list, it allows the addressed recipients to access the message. In this embodiment, messaging server 106 may optionally send a notification that the message is available to be accessed to the addressed recipients.

Another embodiment of a messaging process 250, according to the present invention, is shown in FIG. 2b. The process begins with step 252, in which a user specifies the recipients of the message by entering specifications for a declarative address into declarative address input and generation block 104. The user may enter the declarative address directly, in which case step 253 is not necessary, and the process skips to step 254, in which the declarative address is transmitted to messaging server 106. Alternatively, the user may manipulate a text-based or graphical user interface to enter relevant information, in which case, in step 253, block 104 generates the declarative address from the information entered. Then, in step 254, the declarative address is transmitted to messaging server 106.

In step 256, address resolution module 110 of messaging server 106 receives the declarative address, translates it to a query or set of queries compatible with backend database system 114 and transmits the queries to backend database system 114. In step 258, query evaluation block 116 of backend database system 114 receives the query or set of queries, accesses database 118 to retrieve the information requested by the queries and transmits the retrieved information to address resolution module 110. The retrieved information is a list of the messaging addresses of all users who satisfy the selection parameters specified by the declarative address that was generated by sender system 102. In step 260, messaging server 106 receives the address list and transmits the list to sender system 102, where the list is displayed to the user. In step 262, the user enters a message into sender system 102, the message is received by messaging server 106 and, in one embodiment, the message is transmitted to all addresses included in the list.

Declarative addressing is useful to specify an intended set of recipients based on their properties. There are several types of information which may be specified in a declarative address: filters of directory information, mailing lists and/or filters of mailing lists, and logical combinations thereof.

Persons have a variety of personal, organizational and contact attributes associated with them, such as, electronic mail, name, telephone numbers, addresses, etc. Typically, such information is stored in the form of a directory. One form of declarative address is a filter which selects the desired set of persons from among those in the directory using a combination of values known for selected attributes. A filter may, for example, be specified as a parenthesized prefix expression using the logical operators union (OR, "|"), intersection (AND, "&") and complementation (NOT, "!"), and operands that are themselves filters. The union and intersection operators accept one or more operands, while the complementation operator accepts a single operand. Operator precedence may be default or may be provided by parenthesization. Examples of declarative addresses based on directory information include:

(mail=user1@xyz.com)

This address specifies all persons whose e-mail address is "user1@xyz.com"

(cn=*abc*)

This address specifies all persons whose full name contains the string "abc"

(&(ou=ha617*)(!(title=*manager*)))

This address specifies all persons in any organizational department that begins with the string "ha617" and whose title does not contain the string "manager".

Declarative addresses may be specified by giving the name of the mailing list (also known as a distribution list or mailing alias) to which the person belongs. Combinations of mailing list contents may also be specified using the operators described above. Examples of declarative addresses based on mailing list information include:

(& (codb) (comsg))

This address specifies all persons in the intersection of the mailing list "codb" (all persons at a particular company who are interested in databases) and the mailing list "comsg" (all persons at the company who are interested in messaging).

(&(projectdb)(!(outsidedb))

This address specifies all persons in the mailing list "projectdb" (all persons involved in a particular project) who are not also included in the mailing list "outsidedb" (all persons involved with the company who are not company employees).

Declarative addresses may be specified based on combinations of information from a directory and one or more mailing lists. Uniform syntax in specifying each type of information allows such combinations to be easily specified. Examples of declarative addresses based on combinations of directory and mailing list information include:

(& (project2) (t1=SGD))

This address all persons in the mailing list "project2" whose directory entries indicate that their title is "SGD".

(|(&(project2)(t1=SGD))(jsmith@xyz.com))

This address is similar to the previous example, but also includes the enumerated message address "jsmith@xyz.com", which shows that enumerated addresses may optionally be included in declarative addresses.

A declarative address may be used directly to specify intended recipients for one or more messages, or a declarative address may be used to define new mailing lists. A mailing list definition that uses declarative addressing is termed a declarative mailing list definition. For example, declarative addresses, such as those shown above, may be used to define a new mailing list:

(dbmsg:(&(codb)(comsg)))

This address specifies a new mailing list "dbmsg" that includes all persons in the intersection of the mailing list "codb" (all persons at a particular company interested in databases) and the mailing list "comsg" (all persons interested in messaging).

(insidelist:(&(projectdb)(!(outsidedb)))

This address specifies a new mailing list "insidelist" that includes all persons in the mailing list "projectdb" (all persons involved in a particular project) who are not also included in the mailing list "outsidedb" (all persons involved with the company who are not company employees).

(project2:(&(project1)(t1=SGD)))

This address specifies a new mailing list "project2" that includes all persons in the mailing list "project1" whose directory entries indicate that their title is "SGD".

(project2:(|(&(project1)(t1=SGD))(jsmith@xyz.com)))

This address is similar to the previous example, but the resulting mailing list "project2" also includes the enumerated message address "jsmith@xyz.com", which shows that enumerated addresses may optionally be included in declarative mailing list definitions.

A mailing list that has been defined using declarative addressing may itself be used as an operand in a declarative address, or in a declarative mailing list definition. For example:

(project3:(|(project1)(project2)))

This defines a new mailing list "project3" that includes all persons in the mailing lists "project1" and "project2". The mailing list "project3" may itself be used as an operand in a declarative address, such as:

(&(project3)(t1=SGD))

This address specifies all persons in the mailing list "project3" whose directory entries indicate that their title is "SGD". Likewise, the mailing list "project3" may be used as an operand in a declarative mailing list definition, such as:

(project4:(&(project3)(t1=SGD)))

This defines a new mailing list "project4" that includes all persons in the mailing list "project3" whose directory entries indicate that their title is "SGD".

The examples shown above are illustrative only and are not limiting in any way.

Figure 3A:
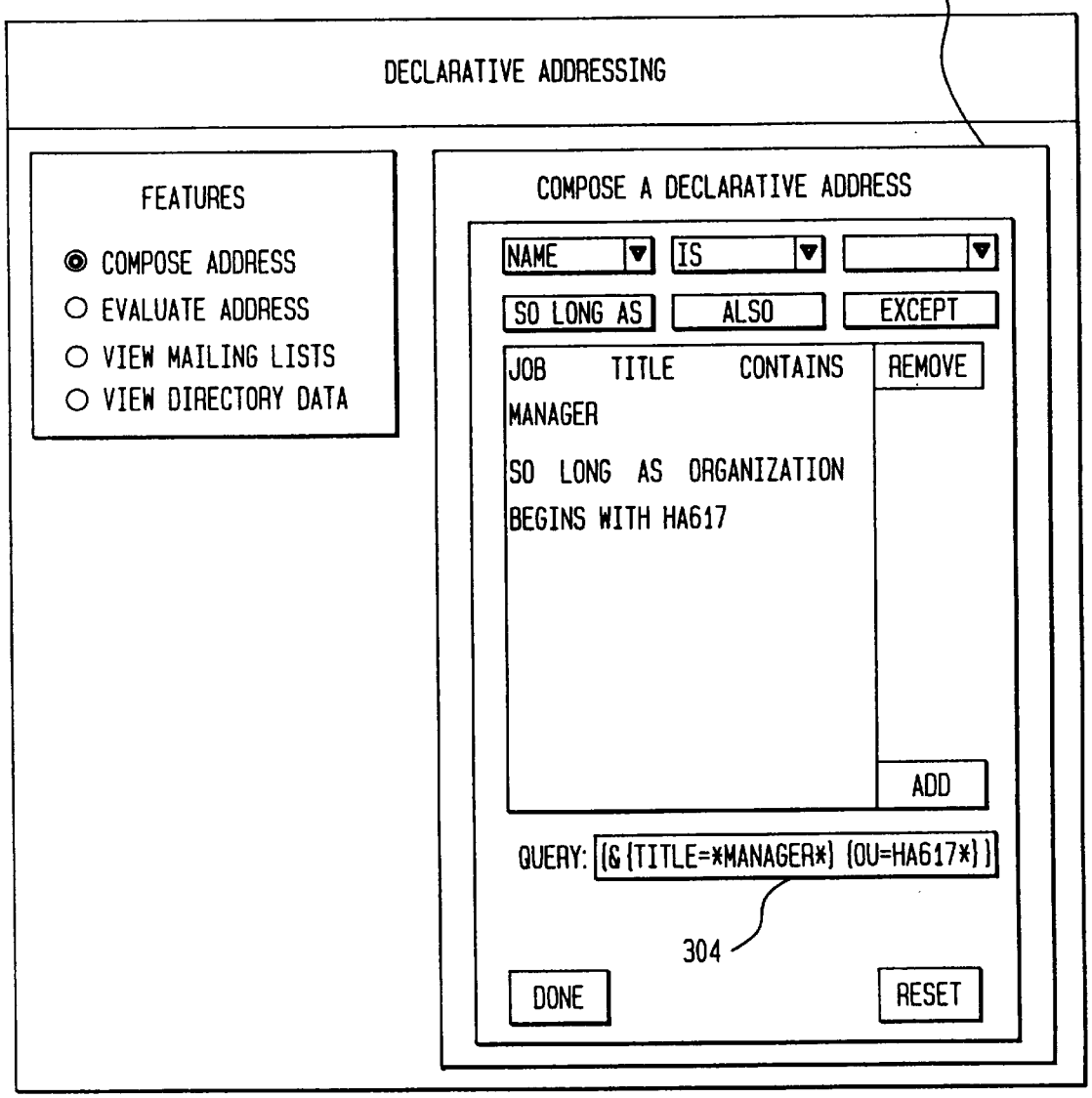
FIG. 3a is an exemplary screen, which allows a user to specify an exemplary address, in the system of FIG. 1.

An exemplary screen 300, which allows a user to specify a declarative address, is shown in FIG. 3a. The user selects information and condition options in box 302 and the resulting declarative address specification that has been generated by declarative address input and generation block of FIG. 1 is displayed in box 304.

An exemplary screen 310, which allows a user to transmit a declarative address for evaluation, is shown in FIG. 3b. The declarative address to be evaluated is displayed to the user in box 312.

An exemplary screen 320, which displays the message addresses resulting from the evaluation of a declarative address, is shown in FIG. 3c. The list of message addresses is shown in box 322. Although email addresses are shown in this example, any type of message addresses may be displayed.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A messaging system comprising:

a messaging server, coupled to a sender system, operable to receive a message from the sender system and transmit the message to a recipient system;

an address resolution module, coupled to the messaging server, operable to receive a declarative address associated with the message, the declarative address defined by a sender of the message and specifying at least one recipient for the message based on properties of the recipient and specifying mailing list information and directory information, resolve the declarative address into at least one messaging address, transmit the at least one messaging address to the messaging server, where the at least one message address is retrieved based on the specified directory information and mailing list information.

2. The messaging system of claim 1, further comprising:

a database system, coupled to the address resolution module, operable to receive a database query, retrieve at least one messaging address specified by the query and transmit the retrieved at least one messaging address; and wherein the address resolution module is further operable to generate a database query based on the declarative address, transmit the generated query to a database system, and receive at least one retrieved messaging address from the database system.

3. The messaging system of claim 2, wherein the messaging server is further operable to transmit the message to at least one recipient system corresponding to the at least one messaging address.

4. The messaging system of claim 3, wherein the message is an email message.

5. The messaging system of claim 3, wherein the message is a voice-mail message.

6. The messaging system of claim 3, wherein the message is a fax message.

7. The messaging system of claim 3, wherein the message is a conference call.

8. The messaging system of claim 3, wherein the message is a paging message.

9. A method of messaging, comprising the steps of:

receiving a declarative address associated with a message, the declarative address defined by a sender of the message and specifying at least one recipient for the message based on properties of the recipient, and specifying a mailing list and directory information;

resolving the declarative address into at least one messaging address;

transmitting the message to the at least one messaging address, where the at least one message address is retrieved based on the specified directory information and mailing list information.

10. The method of claim 9, wherein the resolving step comprises the steps of:

generating a database query based on the received declarative address; and retrieving the at least one messaging address from a database using the generated database query.

11. The method of claim 10, wherein the message is an e-mail message.

12. The method of claim 10, wherein the message is a voice-mail message.

13. The method of claim 10, wherein the message is a fax message.

14. The method of claim 10, wherein tie message is a conference call.

15. The method of claim 10, wherein the message is a paging message.

16. A declarative address, for specifying messaging addresses, comprising:

an operand and an operator, defined by a sender of a message;

the operand specifying at least one messaging address based on a property associated with at least one message recipient associated with the at least one messaging address, wherein the property relates to information in a directory of message recipients and a mailing list of message recipients; and the operator specifying an operation to be performed on the at least one messaging address specified by the operand.

17. A method of defining a mailing list of message recipients, comprising the steps of:

specifying a mailing list identifier, specifying a declarative address, the declarative address specifying message recipients based on properties of the recipients, and the declarative address comprising an operand specifying at least one messaging address based on a property associated with at least one message recipient associated with the at least one messaging address, wherein the property relates to information in a directory of message recipients and a mailing list of message recipients and an operator, specifying an operation to be performed on the least one messaging address specified by the operand; and assigning the declarative address to the mailing list identifier.

18. A method of messaging, comprising the steps of:

receiving a declarative address specification, the declarative address defined by a sender of a message and specifying at least one recipient for the message based on properties of the recipient and further specifying directory information and mailing list information;

generating a declarative address based on the received declarative address specification and transmitting the declarative address to an address resolution module;

translating the declarative address into a database query and transmitting the database query to a database system;

retrieving at least one messaging address from the database system based on the query and transmitting the at least one messaging address to the address resolution module; and transmitting the message to the at least one messaging address.

19. The method of claim 18, wherein the message is an e-mail message.

20. The method of claim 18, wherein the message is a voice-mail message.

21. The method of claim 18, wherein the message is a fax message.

22. The method of claim 18, wherein the message is a conference call.

23. The method of claim 18, wherein the message is a paging message.

* * * * *